United States Patent

Yokoyama et al.

[11] Patent Number: 6,081,367
[45] Date of Patent: Jun. 27, 2000

[54] OPTICAL FILTER MODULE AND OPTICAL AMPLIFIER USING THE SAME

[75] Inventors: Jun Yokoyama; Hiroyuki Kato, both of Tokyo, Japan

[73] Assignee: NEC Corporation, Tokyo, Japan

[21] Appl. No.: 08/987,838

[22] Filed: Dec. 9, 1997

[30] Foreign Application Priority Data

Dec. 10, 1996 [JP] Japan ................................. 8-329837

[51] Int. Cl.$^7$ ................................. H01S 3/00; G02B 5/30
[52] U.S. Cl. ..................... 359/341; 359/494; 359/498; 385/11
[58] Field of Search ................... 359/494–500, 359/339, 341; 385/11

[56] References Cited

U.S. PATENT DOCUMENTS

| | | | |
|---|---|---|---|
| 5,272,560 | 12/1993 | Baney et al. | 359/341 |
| 5,303,314 | 4/1994 | Duling, III et al. | 385/11 |
| 5,596,667 | 1/1997 | Watanabe | 385/11 |
| 5,636,053 | 6/1997 | Pan | 359/341 |
| 5,652,675 | 7/1997 | Shibuya | 359/341 |

FOREIGN PATENT DOCUMENTS 4-358115  11/1992  Japan .

OTHER PUBLICATIONS

Ishio et al., "Optical Amplifier and its Application", OHM Co., 1992.

*Primary Examiner*—Georgia Epps
*Assistant Examiner*—Evelyn A. Lester
*Attorney, Agent, or Firm*—Whitham, Curtis & Whitham

[57] ABSTRACT

An optical filter module with isolator function that has no polarization dependent property and in which no polarization mode dispersion occurs. An optical filter is arranged between a first optical input and output terminal and a second optical input and output terminal. A polarization splitting unit is arranged between the first optical input and output terminal and the optical filter, for separating the light into a first straight polarized light and a second straight polarized light which are in parallel to each other and which have polarization states perpendicular to each other. A first polarization rotation unit is arranged between the polarization splitting unit and the optical filter, for rotating the polarization state of the first straight polarized light by 90° and then sending a first rotated light to the optical filter. A second polarization rotation unit is arranged between the optical filter and the second optical input and output terminal, for rotating light passing through the optical filter by 90° and then sending a second rotated light. A polarization combining unit is arranged between the optical filter and the second optical input and output terminal, for combining the first rotated light with the second rotated light and outputting the resultant to the second input and output terminal.

18 Claims, 4 Drawing Sheets

58: DOUBLY-REFRACTING CRYSTAL PLATE
50,54: POLARIZATION BEAM SPLITTING
51,53: HALF WAVE PLATE

OPTICAL FILTER MODULE AND OPTICAL AMPLIFIER USING THE SAME

BACKGROUND OF THE INVENTION

The present invention relates to a polarization-independent optical filter module with isolator function and to an optical amplifier using the same.

In large capacity optical communications systems using optical fibers, optical amplifiers that directly amplify optical signals, without converting optical signals gradually attenuated during transmission into electric signals, are used. FIG. 6 shows the configuration of the optical fiber amplifier disclosed in the book, "optical amplifier and its applications" item 111, written by Ishio et al., OHM Co., (1992). Because the light output from such an optical fiber amplifier contains noise due to natural radiation rays or pumped laser light components, the optical filter that can suppress light except signal light is needed. Moreover, an isolator is needed to prevent the oscillation in the optical fiber due to the return light. FIG. 7 illustrates the configuration of a conventional filter module.

In order to eliminate the polarization-dependence in the conventional optical filter module, an incident light to the optical filter is maintained in a single polarization mode using a polarization splitting prism and a half-wave plate. The optical filter is assembled aslant to the incident light to adjust the transparent center wavelength. However, any polarization dependence is not occur. Such an optical filter is disclosed in JP-A 358115/1992. FIG. 8 shows the configuration of a conventional isolator disclosed in the book, "optical amplifier and its applications" item 153, written by Ishio et al., OHM Co., (1992). The conventional isolator operates in such a manner that the light propagating in the reverse direction is not coupled to the forward incident fiber using a doubly-refracting prism, a polarized-wave rotor, and a Faraday rotator, in spite of its polarized light mode.

The optical fiber amplifier is a device that injects a pumped laser beam into an optical fiber in which a rare earth element such as erbium is doped and amplifies an original optical signal by guiding the optical signal to be amplified. When the pumped laser light source receives return light, noises occur in the optical fiber amplifier because of disturbance of oscillation inside the laser light source. The noises are amplified in a rare-earth-element-doped fiber and interfere with the signal light. Hence in the optical fiber transmission system, an optical isolator that blocks the light propagating in reverse direction as well as an optical filter that removes noises due to pumped light and natural radiation rays are essential. However, since the conventional optical fiber module does not have the isolation function, the optical filter and the optical isolator must be discretely configured. For that reason, the connecting and adjusting works become complicated. The whole system is large sized. Moreover, the conventional optical filter module has the problem in that polarization dispersion occurs because the optical path of the P-polarized light differs from that of the S-polarized light.

SUMMARY OF THE INVENTION

The present invention is made to solve the above-mentioned problems. The objective of the present invention is to provide an optical filter module with isolator function which has its simplified configuration and which has no polarization dependence property and no polarization mode dispersion property.

Another objective of the present invention is to provide an optical amplifier using the above-mentioned optical filter module.

The objective of the present invention is achieved by an optical filter module comprising a first optical input and output terminal for sending light; a second optical input and output terminal; an optical filter arranged between the first optical input and output terminal and the second optical input and output terminal; polarization splitting means arranged between the first optical input and output terminal and the optical filter, for separating the light into a first straight polarized light and a second straight polarized light which are in parallel to each other and which have polarization states perpendicular to each other; first polarization rotation means arranged between the polarization splitting means and the optical filter, for rotating the polarization state of the first straight polarized light by 90° and then sending a first rotated light to the optical filter; second polarization rotation means arranged between the optical filter and the second optical input and output terminal, for rotating light passing through the optical filter by 90° and then sending a second rotated light; and polarization combining means arranged between the optical filter and the second optical input and output terminal, for combining the first rotated light with the second rotated light and outputting the resultant to the second input and output terminal.

The first rotation means comprises a first optical rotating element for rotating the polarization state of said first straight polarized light by 45° in a first direction, and a first Faraday rotator for further rotating light output from the first optical rotating element by 45° in the same direction. The second rotation means comprises a second optical rotating element for rotating the polarization state of the second straight polarized light by 45° in a second direction, and a second Faraday rotator for further rotating light output from the second optical rotating element by 45° in the same direction.

According to the optical filter module of the present invention, the polarization splitting means comprises a polarization beam splitter and the polarization combining means comprises a polarization beam splitter. Moreover, the polarization splitting means comprises a doubly-refracting crystal plate and the polarization combining means comprises a doubly-refracting crystal plate.

The optical filter comprises a transparent plate on which dielectric multiple-layered film is deposited, a Fabry-Perot plate, a doubly-refracting crystal plate, or a grating. The first optical input and output terminal comprises an optical filter. The second optical input and output terminal comprises an optical filter.

According to the present invention, an optical amplifier comprises a signal input terminal for inputting a signal light; an optical fiber for optical amplification for optically amplifying the signal light; a pumped light source for emitting a pumped light; an optical multiplexer for transmitting the pumped light to the optical fiber; a signal output terminal for outputting the signal light optically-amplified in the optical fiber; and an optical filter module arranged between a signal input terminal and a signal output terminal; the optical filter module, including a first optical input and output terminal for sending light; a second optical input and output terminal; an optical filter arranged between the first optical input and output terminal and the second optical input and output terminal; polarization splitting means arranged between the first optical input and output terminal and the optical filter, for separating the light into a first straight polarized light and a second straight polarized light which are in parallel to each other and which have polarization states perpendicular to each other; first polarization rotation means arranged between the polarization splitting means and the optical filter, for rotating the polarization state of the first straight polarized light by 90° and then sending a first rotated light to the optical filter; second polarization rotation means arranged between the optical filter and the second optical input and output terminal, for rotating light passing through the optical filter by 90° and then sending a second rotated light; and polarization combining means arranged between the optical filter and the second optical input and output terminal, for combining the first rotated light with the second rotated light and outputting the result to the second input and output terminal; the signal input terminal being associated with the first optical input and output terminal, the signal output terminal being associated with the second optical input and output terminal.

When the light emitted forward from the input terminal passes through the optical rotating element and the Faraday rotor, the optical rotating element rotates the polarization state by 45° clockwise and the Faraday rotor further rotates the polarization state by 45° clockwise. As a result, the polarization state rotates clockwise by 90°. When the light passes through the optical rotating element and the Faraday rotor in the reverse direction, the Faraday rotor rotates the polarization state by 45° clockwise while the optical rotating element rotates it by 45° counterclockwise. As a result, the polarization state returns to the original state. The reversely propagating light does not coupled to the optical fiber on the input side. This configuration acts as an isolator.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
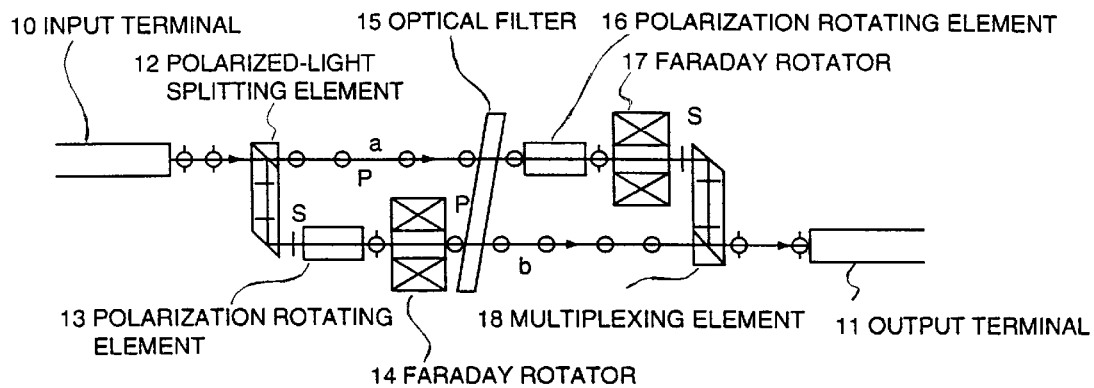
FIG. 1 is a schematic diagram showing the configuration of an optical filter module according to the present invention.

Next, an embodiment of the present invention will be described below in detail with reference to the attached drawings. FIG. 1 is a block diagram showing the optical filter module according to an embodiment of the present invention. The optical filter module comprises input and output terminals 10 and 11, a polarized light separating element 12, an optical rotating elements 13 and 16, Faraday rotators 14 and 17, an optical filter 15, and a multiplexing element 18. The polarized light separating element 12 separates light in an arbitrary polarized state into two polarized light components perpendicular to each other. The multiplexing element 18 synthesizes polarized light components perpendicular to each other. The optical rotating elements 13 and 16 rotate the polarization state of light. The Faraday rotators 14 and 17 rotate the polarization state of light. The rotary direction of the Faraday rotator is reversible.

Next, the behavior of the forward light will be described below with reference to FIG. 1. The light emitted from the input terminal 10a is guided toward the polarized light separating element 12. The polarized light element 12 separates the light into the polarized light (p-polarization) passing through the optical route (a) and being perpendicular to the orientation of FIG. 1 and the polarized light (S-polarization) passing through the optical route (b) and being in parallel to the orientation of FIG. 1. The P-polarized light of the optical route (a) passes through the optical filter 15. The optical rotating element 16 rotates the direction of the P-polarized light by 45°. The Faraday rotator 17 further rotates the direction of P-polarized light by 45°. The multiplexing element 18 synthesizes the rotated light with another polarized light and guides the resultant light toward the output terminal 11.

The polarization direction of light in the optical route (b) is rotated by 45° in the optical rotating element 13. The polarization direction of the light is further rotated by 45° in the Faraday rotator 14. The P-polarized light is guided to the output terminal 11 through the optical filter 15 and the multiplexing element 18. Since the optical filter 15 receives only the P-polarized light, the polarization dependent loss does not occur even if the optical filter 15 is arranged aslant. Moreover, the polarization mode dispersion does not occur because the optical route (a) equals the optical route (b) in length.

Figure 2:
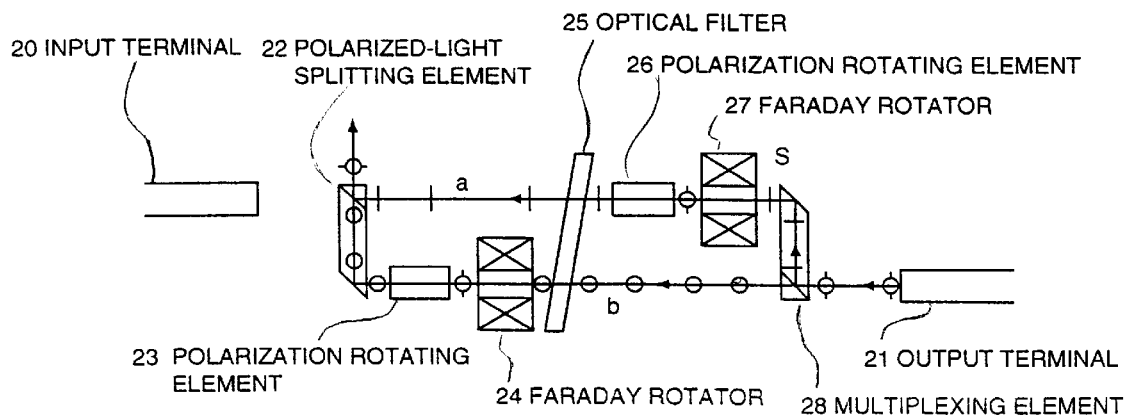
FIG. 2 is a schematic diagram showing the function of an isolator according to the present invention.

Next, characteristics to light in the reverse direction of the optical filter module will be described below by referring to FIG. 2. The multiplexing element 28 separates the light emitted from the output terminal 20b into a P-polarized light component and a S-polarized light component. In the optical route (b), the light propagates through the optical filter 25. Then the Faraday rotator 24 rotates it by 45°. The 45° optical rotating element 23 rotates the light by 45°, counterclockwise to the rotational direction in the Faraday rotator 24. Thus, the P-polarized light in the original polarization state enters the polarized light separating element 22. As a result, the P-polarized light is not coupled to the input terminal 20a. On the other hand, in the optical route (a), the Faraday rotator 27 rotates the polarization state of the light by 45°. The 45° optical rotating element 26 rotates the polarization state by 45°, counterclockwise to the rotational direction in the Faraday rotor. Hence, the polarization state remains the original S-polarization. The light emitted from the 45° optical rotating element 26 reaches the polarized light separating element 22 via the optical filter 25, but is not coupled to the input terminal 20a. Hence, the optical filter module acts as an optical isolator.

In FIG. 1, the optical rotating element 13 and the Faraday rotator 14 are arranged along the optical route (b) at the front stage of the optical filter while the optical rotating element 16 and the Faraday rotator 17 are arranged along the optical route (a) at the rear stage of the optical filter. Thus, the optical filter 15 receives only the P-polarized light. However, the optical filter may receive only the S-polarized light by arranging the optical rotating element and the Faraday rotator along the optical route (a) at the front stage thereof and arranging the optical rotating element and the Faraday rotator along the optical route (b) at the rear stage thereof.

Figure 3:
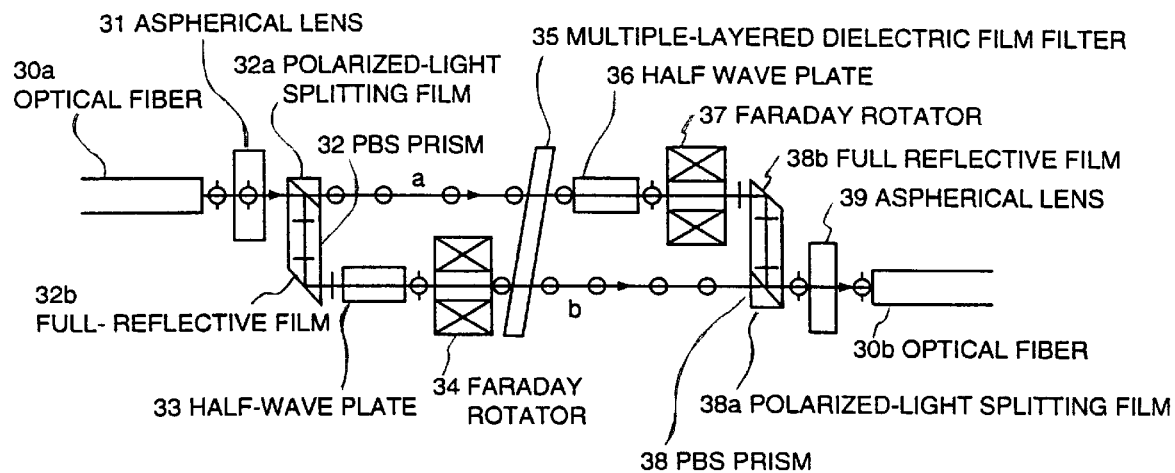
FIG. 3 is a schematic diagram showing an optical filter module according to an embodiment of the present invention.

FIG. 3 is a diagram illustrating an optical filter module according to an embodiment of the present invention. An optical fiber 30a and an aspherical lens 31 are used for the input terminal. An optical fiber 30b and an aspherical lens 39 are used for the output terminal. The PBS prism 32 acts as a polarized light separating element. The PBS prism 38 acts as a multiplexing element. A yttrium iron garnet single crystal substance is used for the Faraday rotators 34 and 37. A magnetic field applying means (not shown) is disposed near to the Faraday rotator. The Faraday rotators 34 and 37 each being formed of a yttrium iron garnet single crystal substance, shown in FIG. 3, are magnetically saturated. The Faraday rotation angle is 45°. A dielectric multiple-layered film filter 35 is used as an optical filter.

Figure 4:
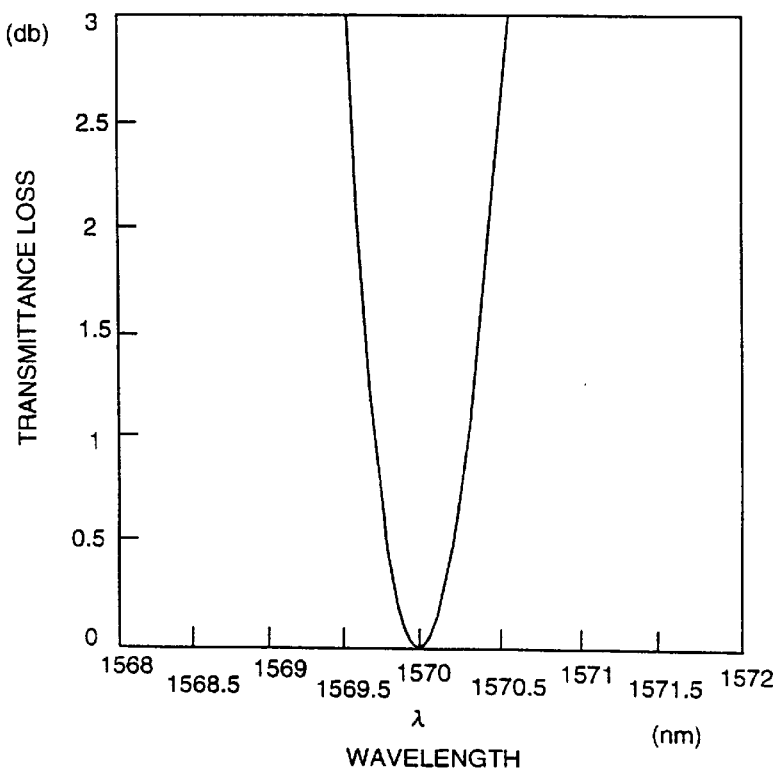
FIG. 4 is a graph plotting the characteristic of a multiple-layered dielectric film filter according to an embodiment of the present invention.
Figure 5:
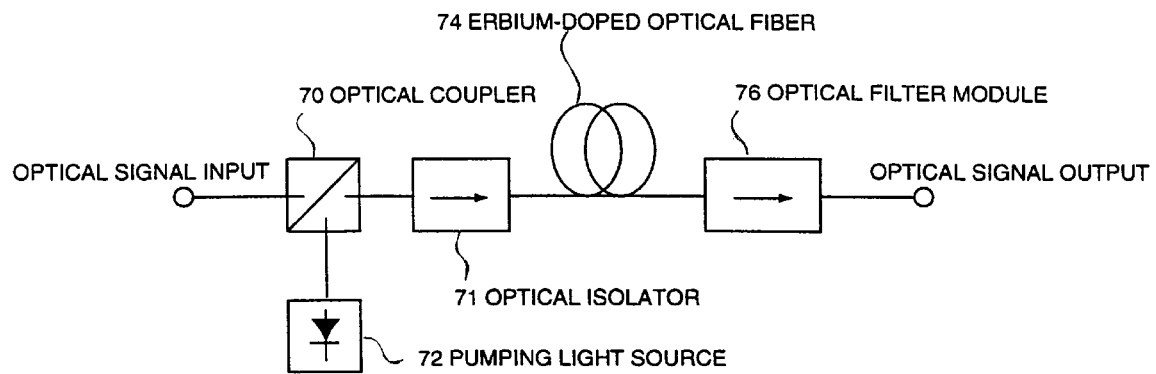
FIG. 5 is a block diagram showing an optical amplifier using an optical filter module according to an embodiment of the present invention.

The characteristic of the dielectric multiple-layered film filter is shown in FIG. 4. FIG. 4 shows a filter characteristic to incident light vertically input. The center wavelength is 1570 nm. However, the center wavelength of the filter is adjusted to 1550 nm. In this case, the incidence angle to the filter is about 15°. In the case of the conventional arrangement of an optical filter and an isolator, the insertion loss is 1.2 dB; the isolation is 30 dB; the polarization independent loss is about 0.2 dB; and the polarization dispersion is 0.5 ps. In the case of the arrangement according to the present embodiment, the insertion loss is less than 1.0 dB; the isolation is more than 30 dB; the polarization dependent loss is less than 0.1 dB; and the polarization dispersion is less than 0.1 ps. An optical filter module with polarization-dependent isolator function can be fabricated. The volume share can be reduced by 15%, in comparison with the conventional arrangement in which an optical filter module and an isolator are discretely arranged.

In the above-mentioned embodiment, a dielectric multiple-layered film is employed for the optical filter. However, the same effect can be obtained by using other type of optical filter such as a Fabry-Perot plate, doubly-refracting crystal plate, grating, or the like. In the above-mentioned embodiment, a PBS prism is used as the polarization separating means. However, other type of polarization separating means such as a doubly-refracting crystal plate may be effectively used.

Next, an optical amplifier using the optical filter module according to the present invention will be described below.

FIG. 1 is a diagram illustrating the configuration of the optical amplifier using the optical filter module of the present invention.

Figure 6:
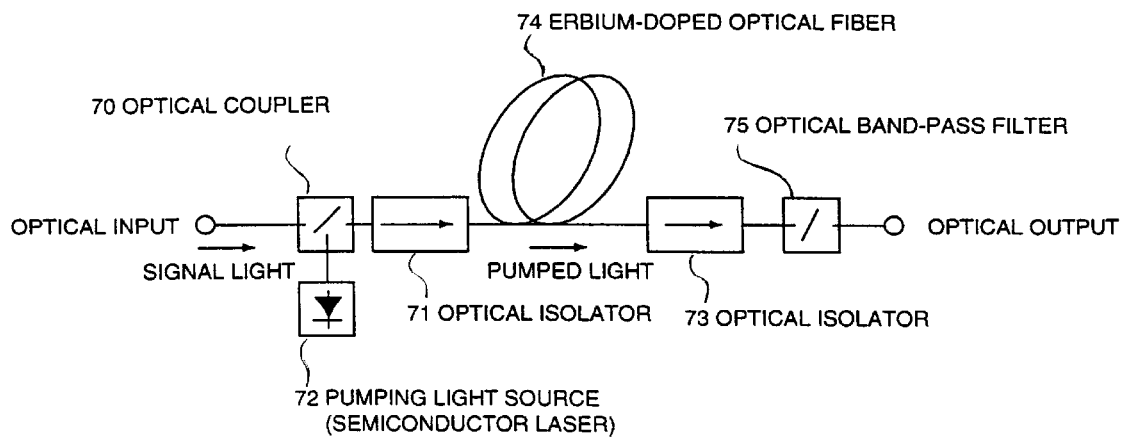
FIG. 6 is a block diagram showing the configuration of an optical fiber module according to an embodiment of the present invention.
Figure 7:
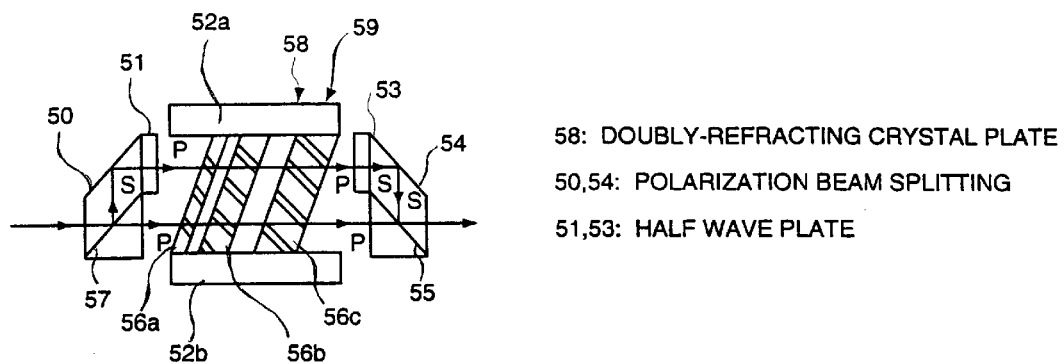
FIG. 7 is a schematic diagram illustrating a conventional optical fiber module.
Figure 8:
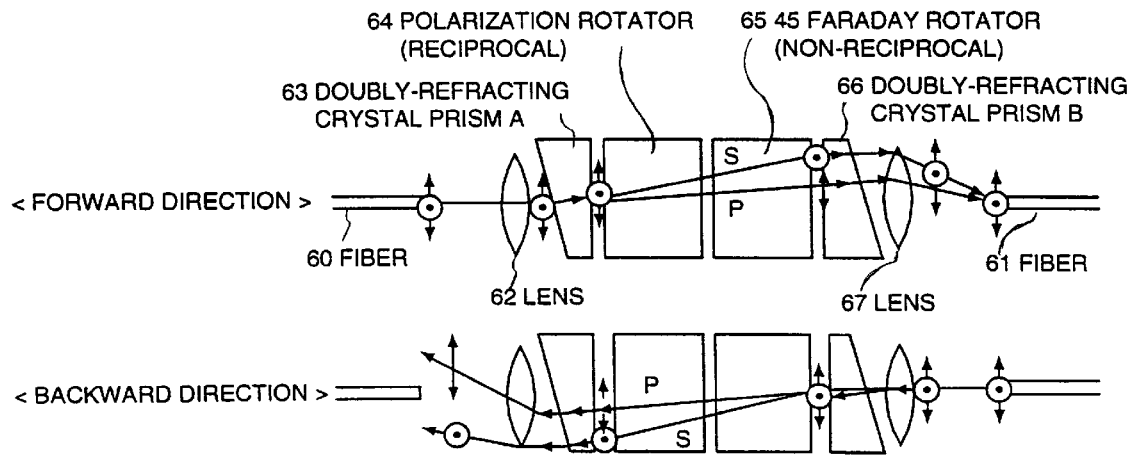
FIG. 8 is a schematic diagram illustrating a conventional optical isolator.

The basic configuration of the optical amplifier is common with that of the conventional optical amplifier. The above-mentioned optical filter module is used in place of the optical isolator 73 and the optical band-pass filter 75 used in the optical amplifier shown in FIG. 6. A forward pumped optical amplifier has been shown as an example in the present embodiment. The backward pumped optical amplifier may be disposed on optical signal output side, not on the side of the optical coupler 70 that multiplexes pumped light.

As described earlier, the optical filter module of the present invention does not have its polarization-dependent property and does not produce polarization mode dispersion. Since the optical filter module also has the optical isolator function and optical filter function, it can improve the performance of the optical amplifier. This feature contributes to simplification and miniaturization of the entire configuration of the system.

As described above, according to the present invention, the optical filter module itself has isolation function. The optical filter module uses the optical rotating element and the Faraday rotator, so that light is not reversely propagated to the input terminal.

Furthermore, the polarization mode dispersion does not occur because two optical paths branched have the same optical length.

The entire disclosure of Japanese Patent Application No. 8-329837 filed on Dec. 10, 1996 including specification, claims, drawing and summary are incorporated herein by reference in its entirety.

What is claimed is:

1. An optical filter module, comprising:
   a first optical input and output terminal for sending light;
   a second optical input and output terminal;
   an optical filter arranged between said first optical input and output terminal and said second optical input and output terminal;
   polarization splitting means arranged between said first optical input and output terminal and said optical filter, for separating said light into a first straight polarized light and a second straight polarized light which are in parallel to each other and which have polarization states perpendicular to each other;
   first polarization rotation means arranged between said polarization splitting means and said optical filter, for rotating the polarization state of said first straight polarized light by 90° and then sending a first rotated light to said optical filter;
   second polarization rotation means arranged between said optical filter and said second optical input and output terminal, for rotating light passing through said optical filter by 90° and then sending a second rotated light; and
   polarization combining means arranged between said optical filter and said second optical input and output terminal, for combining said first rotated light with said second rotated light and outputting the resultant to said second input and output terminal.

2. The optical filter module of claim 1, wherein said first rotation means comprises a first optical rotating element for rotating the polarization state of said first straight polarized light by 45° in a first direction, and a first Faraday rotator for further rotating light output from said first optical rotating element by 45° in the same direction, and wherein said second rotation means comprises a second optical rotating element for rotating the polarization state of said second straight polarized light by 45° in a second direction, and a second Faraday rotator for further rotating light output from said second optical rotating element by 45° in the same direction.

3. The optical filter module of claim 1, wherein said polarization splitting means comprises a polarization beam splitter and wherein said polarization combining means comprises a polarization beam splitter.

4. The optical filter module of claim 1, wherein said polarization splitting means comprises a doubly-refracting crystal plate and wherein said polarization combining means comprises a doubly-refracting crystal plate.

5. The optical filter module of claim 1, wherein said optical filter comprises a transparent plate on which dielectric multiple-layered film is deposited.

6. The optical filter module of claim 1, said optical filter comprises a Fabry-Perot plate.

7. The optical filter module of claim 1, said optical filter comprises a doubly-refracting crystal plate.

8. The optical filter module of claim 1, wherein said optical filter comprises a grating.

9. The optical filter module of claim 1, wherein said first optical input and output terminal comprises an optical filter; and wherein said second optical input and output terminal comprises an optical fiber.

10. An optical amplifier comprising:

a signal input terminal for inputting a signal light;

an optical fiber for optical amplification for optically amplifying said signal light;

a pumped light source for emitting a pumped light;

an optical multiplexer for transmitting said pumped light to said optical fiber;

a signal output terminal for outputting said signal light optically-amplified in said optical fiber; and an optical filter module arranged between a signal input terminal and a signal output terminal;

said optical filter module, including:

a first optical input and output terminal for sending light;

a second optical input and output terminal;

an optical filter arranged between said first optical input and output terminal and said second optical input and output terminal;

polarization splitting means arranged between said first optical input and output terminal and said optical filter, for separating said light into a first straight polarized light and a second straight polarized light which are in parallel to each other and which have polarization states perpendicular to each other;

first polarization rotation means arranged between said polarization splitting means and said optical filter, for rotating the polarization state of said first straight polarized light by 90° and then sending a first rotated light to said optical filter;

second polarization rotation means arranged between said optical filter and said second optical input and output terminal, for rotating light passing through said optical filter by 90° and then sending a second rotated light; and polarization combining means arranged between said optical filter and said second optical input and output terminal, for combining said first rotated light with said second rotated light and outputting the result to said second input and output terminal;

said signal input terminal being associated with said first optical input and output terminal, said signal output terminal being associated with said second optical input and output terminal.

11. The optical amplifier of claim 10, wherein said first rotation means comprises a first optical rotating element for rotating the polarization state of said first straight polarized light by 45° in a first direction, and a first Faraday rotator for further rotating light emitted from said first optical rotating element by 45° in the same direction, and wherein said second rotation means comprises a second optical rotating element for rotating the polarization state of said second straight polarized light by 45° in a second direction, and a second Faraday rotator for further rotating light emitted from said second optical rotating element by 45° in the same direction.

12. The optical amplifier of claim 10, wherein said polarization splitting means comprises a polarization beam splitter and wherein said polarization combining means comprises a polarization beam splitter.

13. The optical amplifier of claim 10, wherein said polarization splitting means comprises a doubly-refracting crystal plate and wherein said polarization combining means comprises a doubly-refracting crystal plate.

14. The optical amplifier of claim 10, wherein said optical filter comprises a transparent plate on which multiple-layered dielectric film is deposited.

15. The optical amplifier of claim 10, wherein said optical filter comprises a Fabry-Perot plate.

16. The optical amplifier of claim 10, wherein said optical filter comprises a doubly-refracting crystal plate.

17. The optical amplifier of claim 10, wherein said optical filter comprises a grating.

18. The optical amplifier of claim 10, wherein said first optical input and output terminal comprises an optical filter; and wherein said second optical input and output terminal comprises an optical fiber.

* * * * *